United States Patent [19]

Buffet et al.

[11] Patent Number: 5,758,863

[45] Date of Patent: Jun. 2, 1998

[54] VALVE CONTROLLED BY FLUID

[75] Inventors: Jean Claude Buffet, Sospel; Lionel Raut, Mention, both of France

[73] Assignee: Ranco Incorporated of Delaware, Wilmington, Del.

[21] Appl. No.: 553,203

[22] Filed: Nov. 7, 1995

[51] Int. Cl.[6] .................................................. F16K 31/40
[52] U.S. Cl. .............................. 251/28; 251/45; 251/65
[58] Field of Search ............................ 251/65, 45, 28

[56] References Cited

U.S. PATENT DOCUMENTS

| 2,629,401 | 2/1953 | Miller | 251/65 |
| 3,376,013 | 4/1968 | Mallett | 251/65 |
| 5,169,117 | 12/1992 | Huang | 251/65 |

FOREIGN PATENT DOCUMENTS

| 21352/67 | 11/1969 | Australia . | |
| 1288240 | 2/1962 | France | 251/28 |
| 1 195 121 | 6/1965 | Germany . | |
| 24 35 256 b2 | 5/1978 | Germany . | |
| 3409673 A1 | 9/1985 | Germany . | |
| WO9423435 | 10/1994 | WIPO | 251/65 |

Primary Examiner—A. Michael Chambers
Attorney, Agent, or Firm—Roger A. Johnston

[57] ABSTRACT

A permanent magnet actuated pilot operated valve having a central permanent magnet disposed within an annular axially polarized magnet. The annular magnet is attached to a pressure responsive membrane moveably responsive to a fluid pressure control signal. Movement of the annular permanent magnet effects movement of the central magnet, either by attraction or repulsion depending on whether like or opposite poling is employed. Movement of the central magnet effects opening of a pilot valve which creates a pressure differential which in turn causes a second pressure responsive membrane to move and effect opening of a main valve. Change in the fluid pressure control signal causes the annular magnet to return to its original position thereby effecting reverse movement of the central magnet and closure of the pilot valve. A bleed hole causes pressure equalization across the second membrane and reclosure of the main valve.

6 Claims, 2 Drawing Sheets

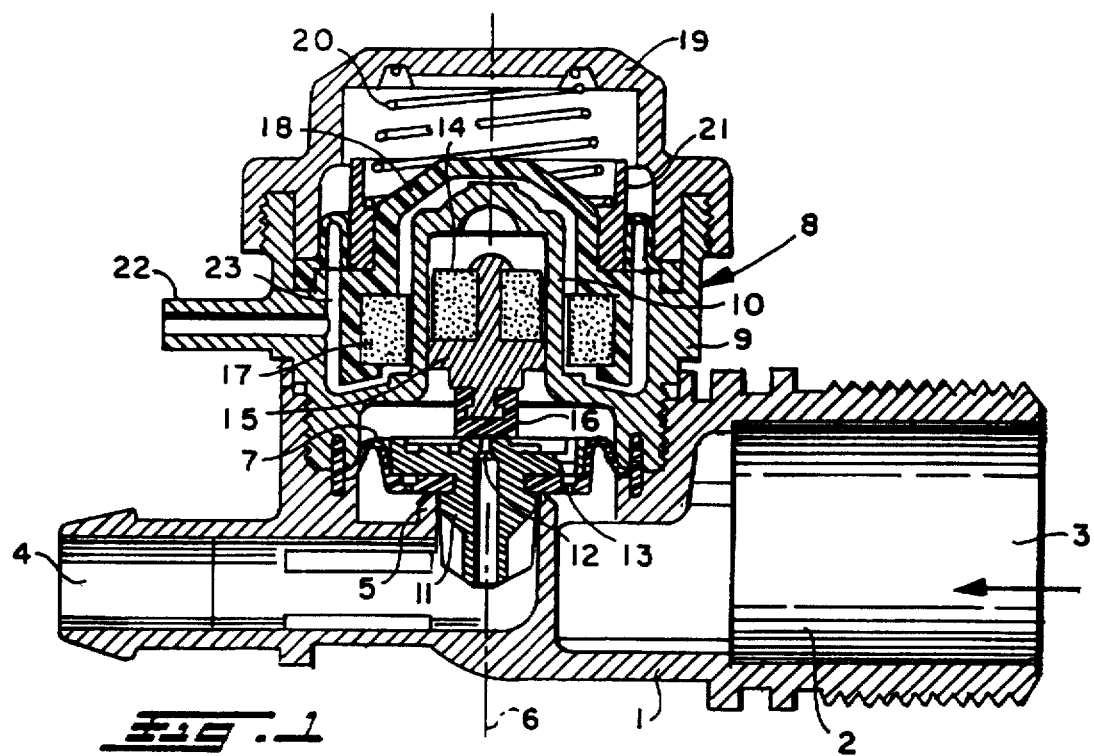
_Fig. 1_
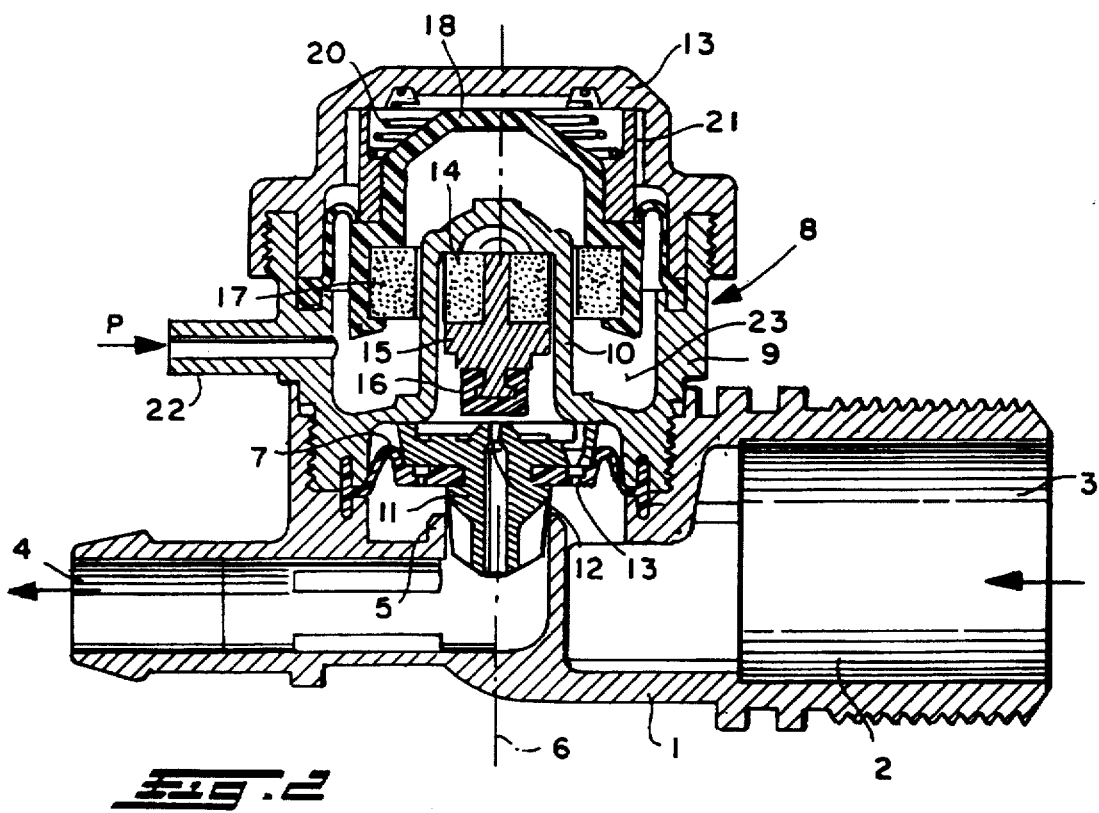
_Fig. 2_

VALVE CONTROLLED BY FLUID

BACKGROUND OF THE INVENTION

The present invention concerns a fluid-actuated valve, e.g., a pneumatic valve, which opens or closes the pathway of a liquid or gas at a signal transmitted by fluid pressure. More specifically, valves of the type which feature a valve body, with a passage through which a main gas or liquid is flowing, a flexible annular membrane which moves to close or open the passage, a pilot insert with a central orifice, attached to the center of the annular membrane, which features at least one lateral bleed orifice; a moving articulation which cooperates with the insert, in the area of the central orifice, and which is itself linked to an axially moving core; and controls which govern the axial motion of the core in response to an external signal.

Valves of the aforesaid type are known as "pilot operated valves" and are usually solenoid actuated valves, in which the pilot valve connected to the armature or core is moved, in at least one direction, by the magnetic field of a solenoid coil. This type of valve thus requires electrical wiring connections to power the solenoid, as well as complex and costly electrical insulation, especially in such applications as washing machines and dishwashers.

It is known in valves of this type to have the motion of the core triggered by a permanent, moving magnet instead of a solenoid. This magnet is displaced by a membrane which is distended by the pressure exerted by a pilot fluid, usually air. The valve core is a simple metallic part which can be displaced by magnetic coupling as a function of the position of the moving magnet. A plastic seal separates the magnet from the moving core. The core features a return spring which acts to close the valve.

This latter type of valve, the configuration of the magnetic actuation system is usually of the parallel air gap type. This means that when the valve is closed, the moving core is sufficiently distant from the magnet to make it impossible for the latter to reopen the valve, because the air gap (between the core and the magnet) is too large, and the magnetic coupling therefore too weak to attract the moving core. Thus, in washing machines, the function of the device is limited to closing the valve in case of leakage or overflow.

SUMMARY OF THE INVENTION

This invention aims to overcome the above-described disadvantages with a fluid-actuated valve of the same general type, but having a magnet configuration which improves the performance. The valve of the present invention can, for instance, open and close the valving passage even when the main fluid is at high pressure, and reopen automatically. Furthermore, it makes the customary return spring on the moving core superfluous.

The fluid-actuated valve which is the subject of the present invention is controlled by (a) a central permanent magnet, which constitutes the moving core, by a magnet mechanically linked to the moving seal that cooperates with the pilot insert; and by (b) an annular magnet which is coaxial with the central magnet and positioned at approximately the same level as the latter, from which it is separated by a sealing wall. The annular magnet is displaced axially against a return device under the pressure of a pilot fluid, which enters into a space separated from the main fluid passage by the sealing wall. The pilot fluid exerts pressure on a moving and/or flexible element linked to the annular magnet.

Thus, the valve according to the present invention features a combination of two magnets, one internal and one external, which are mounted coaxially in a small space; and it provides improved performance as compared to known valves which use different magnet configurations (usually of the parallel air gap type). The coaxial configuration according to the present invention yields substantially higher magnetic forces than valves having parallel air gap configurations. Specifically, valves according to the present invention can work at opening and closing pressures equal to, or greater than, 10 bars. Furthermore, since the two magnets are relatively close, the magnetic field furnishes the pressure needed to seal off the central orifice which pilots the insert, making the usual valve-closing spring superfluous. The coaxial configuration of the magnets allows the external annual magnet to remain close to the central magnet; thus, the valve can also be reopened automatically.

The coaxial configuration of the magnets of the present invention also uses less magnetic material, and thus makes for a smaller valve.

The valve presented by this invention obviates the need for electrical power, making complex and costly electrical insulation unnecessary.

In summary, the fluid-actuated valve according to the invention is simple to make, compact and economical, while yielding superior performance from the standpoint of reliability, manufacturability and accuracy.

In a preferred embodiment of the fluid-actuated valve, the annular magnet is inserted in a bell-shaped membrane and defines the annular space into which the actuating fluid is introduced. This membrane (which is distinct from the annular membrane linked to the pilot insert) is distended and/or displaced, together with the annular magnet it bears, by the pressure of the actuating fluid.

In one embodiment of the invention, the bell-shaped membrane is controlled by a return spring, which exerts a pressure which moves the annular magnet towards the valve body; conversely, when the pressurized actuating fluid enters the annular space mentioned above, the distention of the membrane moves the annular magnet away from the valve body.

In one particular embodiment, the annular space mentioned above is defined by a separator equipped with an external cylindrically-shaped part, which features an actuating-fluid inlet connector, and with an internal cylindrically-shaped part, which is surrounded coaxially by the annular magnet inserted into the bell-shaped membrane. The internal cylindrically-shaped part surrounds and guides the central magnet linked to the pilot insert.

As far as the polarization of the permanent magnets is concerned, the corresponding end faces (i.e. the ends which face in the same direction) of the central magnet and of the annular magnet may, in one embodiment, be of inverse polarity, so that the annular magnet (displaced in one direction by the actuating fluid pressure and in the other by the return device) moves in the same direction as the central magnet (and, therefore, as the pilot insert), under the influence of magnetic attraction.

In another embodiment, the corresponding end faces of the central magnet and of the annular magnet may be of the same polarity, so that the annular magnet (displaced in one direction by the actuating fluid pressure and in the other by the return device) moves in the opposite direction from the central magnet (and, therefore, from the pilot insert), under the influence of magnetic repulsion.

This last described mode of magnetic operation, which creates an "alternating" effect, makes the device more sensitive to the critical pressure of the actuating fluid which controls the opening and the closing of the valve.

The "alternating effect" embodiment of the valve according to the invention is more specifically suitable for washing machine and dishwasher applications, as a filling valve fitted on the washing machine water inlet, which automatically shuts off the water. The valve's actuating-fluid pressure is then directly linked to the water level in the washing machine.

BRIEF DESCRIPTION OF THE DRAWINGS

FIG. 1 is a cross section of a pneumatically actuated valve according to the invention, in the closed position;

FIG. 2 is a cross section of the valve in FIG. 1, in the open position;

DETAILED DESCRIPTION

Figure 3:
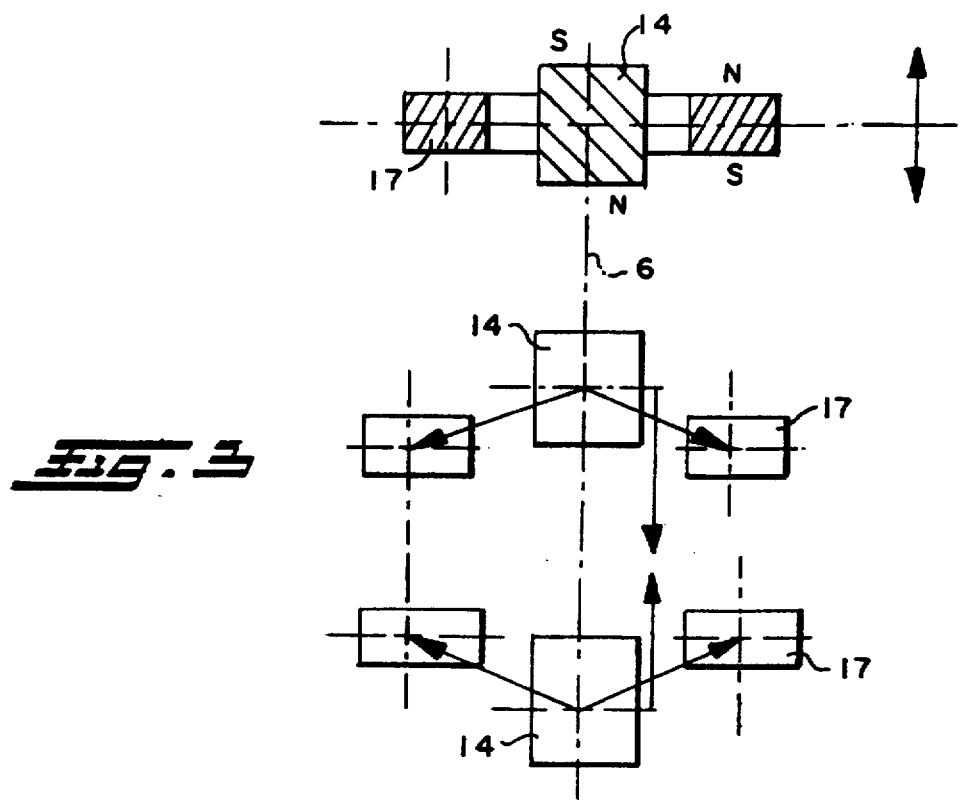
FIG. 3 is an operating diagram showing one mode of magnetic operation of said valve.

FIGS. 1 and 2 illustrate the component structure of a pneumatically actuated valve according to the invention.

The valve consists of valve body 1, featuring main fluid passage 2, e.g., a liquid pathway, which extends from fluid inlet 3 to fluid exit 4. Fluid passage 2 features annular seat 5. Axis 6 of said annular seat is perpendicular to the pathway of passage 2. Flexible annular membrane 7 cooperates with seat 5 to close or open passage 2.

The outer circumference of annular membrane 7 is disposed and kept in position between valve body 1 on one side and separator 8 on the other. Separator 8 is equipped with an external cylindrically-shaped portion 9 and with internal cylindrically-shaped portion 10, both coaxial with axis 6, mentioned above, and, therefore, with each other.

Pilot insert 11 is attached to the center of annular membrane 7. The pilot insert, which features central orifice 12, is mounted in such a way as to move by translation along axis 6 when the membrane 7 is moved.

Annular membrane 7 also features a laterally disposed bleed orifice 13, which has a smaller diameter than that of central orifice 12.

Central permanent magnet 14, which is generally cylindrical in shape, is mounted to the internal cylindrically-shaped part 10 of separator 8. Magnet 14 glides along axis 6 and is attached to seal holder 15, which has attached thereto a seal 16, which faces pilot insert 11.

Annular permanent magnet 17 is positioned around internal cylindrically-shaped part 10 of separator 8. Annular permanent magnet 17, which is inserted in a second, bell-shaped membrane 18, is mounted in such a way that it glides along axis 6.

Separator 8 features a lid or cover, 19; and, bell-shaped membrane 18 is kept in place between internal cylindrically-shaped part 10 of said separator 8 and lid 19. Helical spring 20, housed under lid 19, rests at one end against the undersurface of lid 19, and at the other end against annular spring support 21, which in turn rests against a shoulder of bell-shaped membrane 18.

External cylindrically-shaped wall 9 of separator 8 features connector 22 having a central passage or port, opening into annular space 23 between said wall 9 and bell-shaped membrane 18.

When in use, the valve is installed on a main fluid supply (e.g., water supply), with fluid entering via fluid inlet 3 and exiting via fluid exit 4. Connector 22 is connected to a compressed air supply. Inside the valve, separator 8 acts as a seal between the part which is supplied with main fluid and the part which is supplied with pilot fluid (i.e. compressed air, in the case of this example).

The valve is normally closed. In other words, when no air pressure is present at the port in connector 22, annular membrane 7 is pressed against seat 5 and thus closes main fluid passage 2 (see FIG. 1).

In the absence of any pressure at the port in connector 22, helical spring 20 is relaxed and presses, via annular spring support 21, against bell-shaped membrane 18 and annular permanent magnet 17, which is then at its minimum distance or downward most positions with respect to valve body 1.

At the same time, the magnetic coupling also keeps central magnet 14 in the downward position which is closest to valve body 1, which causes seal 16 to close pilot orifice 12 of insert 11 and keeps annular membrane 7 pressed against seat 5. More specifically, the closing of central orifice 12 permits the pressure on the opposite sides of annular membrane 7 to equalize through bleed hole 13, which then closes main fluid passage 2 because of the loss of pressure created on its lower side by the vortex effect of the fluid circulating in said main fluid passage 2, and because of the force which central magnet 14 exerts via seal 16.

The relative position of magnets 14 and 17 maintains sufficient pressure on seal 16 to keep central orifice 12 closed; thus, there is no need for a spring.

More specifically, the magnetic operating mode of the valve can be as shown in FIG. 3. The two circular ends of central magnet 14 are of N and S polarity, respectively, while the two corresponding axially opposite annular faces of annular magnet 17 are of inverse polarity (S and N). The upper part view of FIG. 3 shows magnets 14 and 17 in the balanced position. When annular magnet 17 moves downwards, central magnet 14 is attracted downwards, as shown in the central view portion of FIG. 3. This corresponds to the closed position of the valve illustrated in FIG. 1.

Referring to FIG. 2, when air pressure P is present at the port in connector 22, the air entering into annular space 23 distends bell-shaped membrane 18 causing it to move upwards towards the undersurface or bottom of lid 19. Annular spring support 21 is also moved, and helical spring 20 is compressed.

Annular magnet 17, which moves with bell-shaped membrane 18, is moved upwardly away from valve body 1, while central magnet 14 moves in the same direction, due to magnetic attraction (see also the lower or bottom view of FIG. 3).

Seal 16 is then moved upwardly away from contact with the pilot valve seat on insert 11 in annular membrane 7 and opens central orifice 12 of pilot insert 11. The net effect is a pressure differential between the upper and lower faces of annular membrane 7, based on the ratio of the diameter of central orifice 12 to that of lateral or bleed orifice 13 (because central orifice 12 is of larger diameter than lateral or bleed orifice 13, there is a loss of hydraulic load, which creates a pressure differential between the two faces of the membrane). Annular membrane 7 then moves and frees water passage 2. Thus, the valve reaches its open position (FIG. 2).

Upon removal of the air pressure signal from the port at connector 22, due to the action of helical spring 20 and of annular spring support 21, annular magnet 17 and central magnet 14 return to their original positions, which closes the valve by sealing pilot orifice 12 of insert 11.

Figure 4:
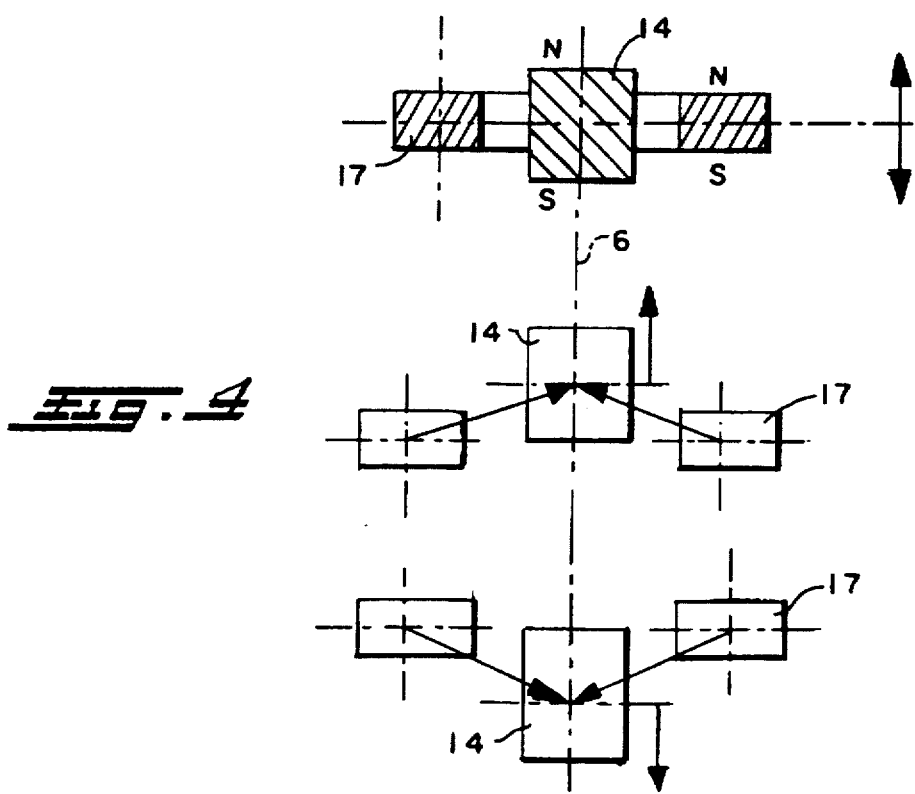
FIG. 4 is an operating diagram showing another possible mode of magnetic operation of the valve according to the invention.

Referring to FIG. 4, an embodiment of the invention is illustrated which employs the same, magnetic operating principle but which uses magnetic repulsion rather than magnetic attraction. In the FIG. 4 embodiment, the two circular ends of central magnet 14 are of N and S polarity, respectively, and the two corresponding annular axial faces of annular magnet 17 are of the same N and S polarity, instead of reverse polarity, as was the case in FIG. 3. The upper section or view of FIG. 4 shows magnets 14 and 17 in the balanced position. When annular permanent magnet 17 is moved downwards from the position shown in the upper view of FIG. 4, magnetic repulsion causes central magnet 14 to move upwards, to the position shown in the central portion or view of FIG. 4. Conversely, when annular permanent magnet 17 is moved upwards from the position shown in the upper view of FIG. 4, magnetic repulsion causes central magnet 14 to move downwards, as shown in the lower view or section of FIG. 4. In the latter case, the operation of the valve system is reversed: an air pressure signal to the port in connector 22 causes the valve to close, rather than to open.

Pneumatic control of the valve can be provided by an air pump or by any other means of generating an air pressure signal at connector 22.

Applications of the fluid-actuated valve which have just been described include washing machines and dishwashers, where the present invention can replace existing pressure-sensitive switching devices, which measure the height of water in the machine and close an electrical switch which controls the solenoid valve that fills the washing machine. In such applications, the valve according to the invention is connected, via the port in its connector 22, to the water column created by the water level in the washing machine, by the intermediary of an air column which transmits the water pressure. In such an application, the valve has the advantage of allowing for automatic reopening of the water passage, just like a solenoid valve actuated by a pressure-sensitive switch—which is not possible with existing permanent magnet valves, because of the peculiarities of the magnetic coupling.

The scope of the invention is not limited to the fluid-actuated embodiment described above by way of example, but extends to all manufacturing and application variants based on the same principle. For example, it is possible to change the details of the shapes of the valve components or to use a liquid such as water as a pilot fluid, instead of air, without leaving the scope of the invention which is more particularly defined by the following claims.

We claim:

1. A fluid-actuated valve, featuring a valve body with a main fluid passage, a flexible annular membrane which can move to close or open said main fluid passage, a pilot insert, attached to the center of said annular membrane and featuring a central orifice, while the annular membrane features at least one bleed orifice; a moving seal, which cooperates with pilot insert in the vicinity of central orifice and which is linked to an axial-displacement core; and a mechanism which controls the axial displacement of the moving core in response to an external signal, characterized in that said control mechanism features (a) a central permanent magnet, which constitutes the moving core and is linked directly to said moving seal which cooperates with said pilot insert, and (b) an annular permanent magnet, which is coaxial with the central magnet and positioned at approximately the same level as the latter, from which it is separated by a sealing wall, said annular magnet is of inverse polarity (N or S) so that when it moves axially against the return devices under the effect of the pressure of a pilot fluid magnetic repulsion causes the central magnet to move in the opposite direction, which enters into a space, separated from main fluid passage by said wall, wherein the pilot fluid exerts pressure on a moving and/or flexible part linked to the annular magnet.

2. Fluid-actuated valve according to claim 1, characterized in that annular magnet is inserted into a bell-shaped membrane which defines an annular space into which a pilot fluid enters.

3. Fluid-actuated valve according to claim 2, characterized in that the bell-shaped membrane is subjected to pressure from a return spring which moves the annular permanent magnet towards the valve body, while the entry of pressurized actuating-fluid into the said space distends membrane so that the annular magnet moves away from the valve body.

4. Fluid-actuated valve according to claim 2, characterized in that the said space is bounded by a separator equipped with an external cylindrically-shaped part which features an actuating fluid inlet connector, and with an internal cylindrically-shaped part which is surrounded coaxially by the annular magnet inserted into the bell-shaped membrane, wherein said internal cylindrically-shaped part surrounds and guides the central magnet linked to the pilot insert.

5. Fluid-actuated valve according to claim 1, characterized in that the corresponding circular ends of central magnet and of annular magnet are of inverse polarity (N or S), so that when annular magnet moves in one direction under the effect of pressure of the pilot fluid and in the opposite direction under the effect of the return mechanism, magnetic attraction causes the central magnet and pilot insert to move in the same direction.

6. Fluid-actuated valve according to claim 1, characterized in that it is used as a washing-machine or dishwasher filling valve, is positioned on the water supply of the washing-machine and automatically shuts off the water supply, pressure of the valve's actuating fluid being linked to the level of water inside the washing machine.

* * * * *